United States Patent [19]
Olschewski et al.

[11] Patent Number: 4,457,740
[45] Date of Patent: Jul. 3, 1984

[54] PIN FOR TENSION ROLLERS

[75] Inventors: Armin Olschewski, Schweinfurt; Manfred Brandenstein, Eussenheim; Lothar Walter, Schweinfurt, all of Fed Rep. of Germany

[73] Assignee: SKF Kugellagerfabriken GmbH, Schweinfurt, Fed. Rep. of Germany

[21] Appl. No.: 267,623

[22] Filed: May 27, 1981

[30] Foreign Application Priority Data

May 30, 1980 [DE] Fed. Rep. of Germany ....... 8014496

[51] Int. Cl.³ .............................................. F16H 7/10
[52] U.S. Cl. ..................................... 474/112; 474/199; 74/211
[58] Field of Search .................... 474/95, 96, 112, 199; 74/449, 211; 411/122, 147, 150, 154, 155, 156

[56] References Cited

U.S. PATENT DOCUMENTS

| 925,496 | 6/1909 | McKinley | 411/147 |
| 1,990,805 | 2/1935 | Watson et al. | 474/199 |
| 2,013,059 | 9/1935 | Leslie | 411/147 |
| 2,383,808 | 8/1945 | MacLean | 411/155 |
| 2,909,074 | 10/1959 | Scheiterlein | 474/112 |
| 3,733,919 | 5/1973 | Rupp | 474/112 |
| 4,033,196 | 7/1977 | Maeda | 474/199 |

FOREIGN PATENT DOCUMENTS

| 7328570 | 2/1975 | Fed. Rep. of Germany . |
| 2617368 | 2/1977 | Fed. Rep. of Germany ...... 474/112 |

Primary Examiner—John E. Murtagh
Assistant Examiner—Andrew Joseph Rudy
Attorney, Agent, or Firm—Daniel M. Rosen

[57] ABSTRACT

A tension roller pin including a hollow member, a rolling surface rotationally supported by a rolling bearing on said hollow member, an eccentrically displaced screw penetrating the pin for fastening the tension roller, a working surface for an adjusting member eccentrically displacing the pin by turning about the screw, the pin being formed as a continuous one piece hollow sleeve having a base at one end and a guide element at the other.

9 Claims, 4 Drawing Figures

PIN FOR TENSION ROLLERS

BACKGROUND OF INVENTION

The present invention relates to tension rollers and particularly to a tension roller constructed as a hollow pin member supporting a rolling surface which is rotationally movable by a rolling bearing and which is detachably fastened to a machine part by means of an eccentrically displaced screw penetrating the pin. By means of working surfaces for an adjusting member, the pin is eccentrically displaceable by turning about the screw.

DESCRIPTION OF THE PRIOR ART

A pin for a tension roller is known, having a hollow member and guide elements, at one or both ends, with eccentrically displaced bores, which are connected and secured against twisting, with the hollow member as disclosed in German Pat. (DE-GM 7,328,570).

In this known solution the pin consists of two differently formed parts which require extensive tooling for manufacture and costly inventory. In addition, special operations must be carried out in assembly of the pin in order to connect the two parts together without twisting.

The object of the present invention is to provide a pin for a tension roller, the number of parts of which is small and the manufacture of which is relatively simple and can be done at modest expense in terms of tools, inventory and assembly.

BRIEF DESCRIPTION OF THE INVENTION

These objectives are obtained pursuant to the invention in that the pin is designed as a bushing provided at one end with a base. The bushing, at its open end, is provided with a guide element formed integrally with the bushing. This guide element may, according to an additional feature of the invention, be designed as a tab, turned essentially radially inward at the free edge of the bushing.

In this way it is possible to make the pin as a basin- or cup-shaped extrusion molding with a tab, at the free edge, first turned radially outward and then in a further process, folded over radially inward substantially 180° from its radially outward position. The pin thus consists of only one part, and no further measures are necessary for connecting the parts. Thus, inventory is likewise substantially simplified.

According to a further feature of the invention, the tab is folded over to less than 180° from its radially outward position, so that it is oriented slightly obliquely to the normal of the shaft. In this way a certain initial tension may be realized, between a fastening screw extending through the pin for mounting the tension roller, thereby preventing loosening of the fastening screw.

According to a further feature of the invention, the base of the bushing and the tab are provided with corresponding eccentric bores, which serve as guide surfaces for the screw for fastening the tension roller.

According to another feature of the invention, the base and/or the tab of the bushing is provided with working surfaces for an adjusting member.

The inner races for the rolling bearing may, according to an additional feature of the invention, be worked directly into the pin. It is alternatively possible, however, to mount a rolling bearing on the pin consisting of an inner ring, an outer ring and a set of rolling members.

DESCRIPTION OF THE DRAWINGS

Examples of the invention are represented in the accompanying drawing, in which.

DETAILED DESCRIPTION OF THE INVENTION

Figure 1:
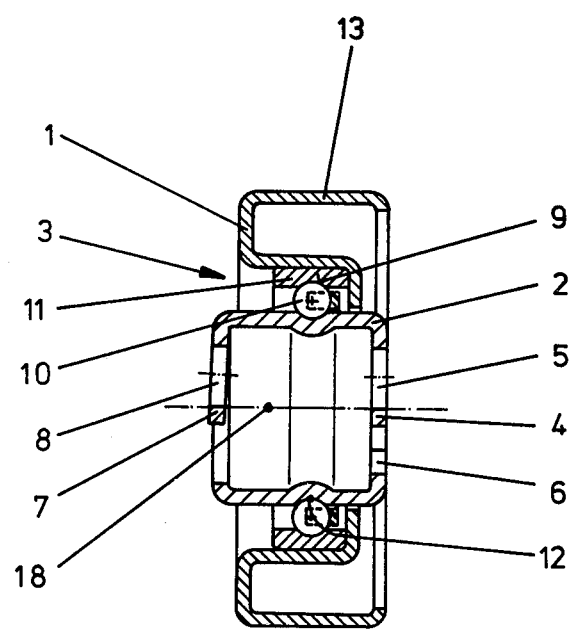
FIG. 1 shows a tension roller in section with the pin pursuant to the invention, into the surface of which the races for the rolling members are worked directly, FIG. 2, a tension roller in section, in which a rolling bearing consisting of an inner ring, an outer ring and a set of rolling members, is mounted on the pin, FIG. 3, a section through the pin of FIGS. 1 and 2 only, in the various stages of manufacture, and FIG. 4, a side view of the pin of FIG. 3 in its final condition.

The tension roller of FIG. 1 includes of the roller member 1, the pin 2 and the rolling bearing 3 arranged between roller member 1 and pin 2, all concentric about central axis 18. The pin 2 is formed as a continuous one piece hollow sleeve and has a base 4, which is provided with an eccentric bore 5 serving, eccentric to the xis 18, as guide surface for a screw (not represented in greater detail), penetrating the pin 2, for the detachable fastening of the tension roller to a machine part; bore 5 defines a 2nd axis eccentrically displaced from said central axis. The base 4 of the pin 2 is further provided with a key face 6, which serves as working surface for an adjusting member (not shown) for eccentrically displacing said pin by turning about a fastening. At the opposite end facing the base 4 the pin 2 is provided with a tab 7, turned essentially radially inward, which is formed in one piece with the pin 2 and is provided with a bore 8 corresponding with the bore 5 in the base. The pin's cylindrical sleeve walls, base, and guide tab 7 have generally the same thickness as shown.

The rolling bearing 3, supporting the roller member 1 in a manner rotationally movable on the pin 2, has an outer ring 11 bearing the outer race 9 for the balls 10, while the inner race 12 is worked directly into the surface of the pin 2.

The roller member 1 is designed in one piece and in cross section essentially as a cup-shaped sheet part with an edge 13 turned over axially. A belt (not shown) may be positioned to run off the surface of the edge 13. The roller member 1 is pressed in simple fashion on the surface of the outer ring 11 of the rolling bearing 3.

Figure 2:
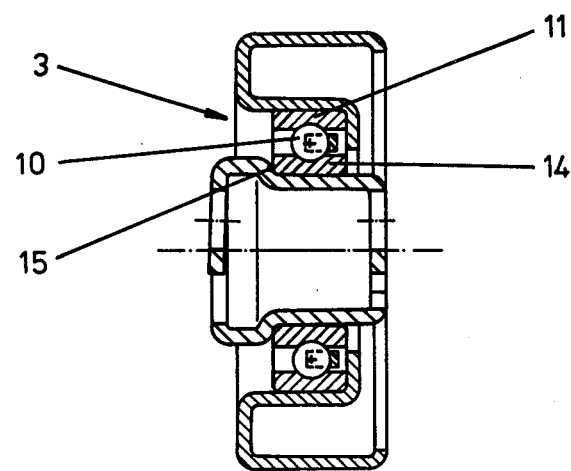

In the example of FIG. 2 the rolling bearing 3 supporting the roller member 1 on the pin 2 is provided not only with an outer ring 11, but alternatively with an inner ring 14, the balls 10 rolling between the races of the two bearing rings. In this example the pin 2 is designed with an offset at the surface, so that an axial contact surface 15 is formed for the inner race 14 of the rolling bearing 3.

Figure 3:
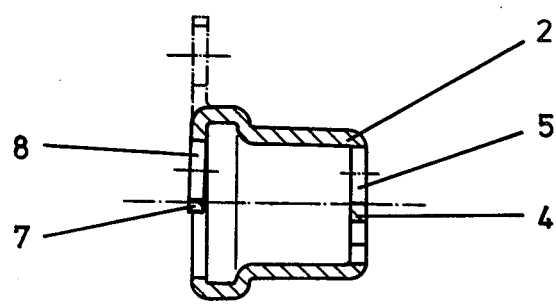
Figure 4:
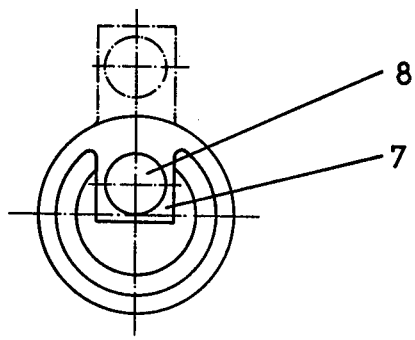

In FIGS. 3 and 4 the pin 2 is represented alone. At one end it has the base 4 and at the other end a tab 7 bent radially inward, which is formed in one piece with the pin 2. The tab 7 has a bore 8 corresponding to the eccentric bore 5 in the base 4 receiving the fastening screw, which bore 8 serves as guide surface for the fastening element.

In the manufacture of the pin 2 a cup-shaped part is first produced by extrusion molding or deep drawing, and provided at its free edge with a tab (represented dashed in FIGS. 3 and 4) turned radially outward. This tab is then folded over inward almost 180°. The bores 5 and 8, as well as the working surfaces 6, are then worked into the pin so formed. It is of course alternatively possible to form these recesses earlier, in deep-drawing or extrusion molding of the cup-shaped part.

It is advantageous to design the tab somewhat obliquely outward to the normal of the shaft, so that in fastening the pin, and thus the tension roller, on a machine part by means of a screw a certain initial tension is exerted which prevents the screw from loosening.

Other modifications and variations within the scope of the invention will be apparent to those skilled in the art.

What is claimed is:

1. A tension roller comprising a pin, a roller member rotatable about the axis of said pin, a rolling bearing mounted on said pin and supporting said roller member, said pin being formed as a continuous one piece hollow sleeve with first and second ends and with a base at the first end and a guide element at the second end, the guide element extending essentially radially inward, said base and guide element being traversed by an eccentric bore eccentrically displaced from the axis of said pin, said base further defining a working surface enabling the eccentric rotating of said pin about said axis, said pin being mountable by the extending of fastening means in said bore in said base and guide element.

2. A tension roller according to claim 1, wherein said guide element comprises a tab.

3. A tension roller according to claim 2 wherein said tab extends slightly obliquely to said axis.

4. A tension roller according to claim 1 wherein said pin has an outer circumferential surface which comprises the inner race of said rolling bearing.

5. A tension roller comprising a pin, a roller member rotatable about the axis of said pin and said pin, and a rolling bearing mounted on said pin and supporting said roller member, said pin being formed as a continuous one piece hollow sleeve having first and second ends with a base at said first end and a guide element at said second end, the guide element extending slightly obliquely of said axis, said base and guide element being traversed by said axis and by an eccentric bore eccentrically displaced from said axis, said tension roller further comprising means for eccentrically displacing said pin about the axis of said bore.

6. A central support pin for a tension roller where the tension roller includes a roller member rotatably supported on a rolling bearing mounted circumferentially about said pin, said pin formed as a hollow member comprising a continuous one piece sleeve having first and second ends and with a base at the first end and a guide element at the second end, the guide element extending transversely of said pin with an axis extending through said pin, and a bore eccentrically displaced from said axis, and means for eccentrically displacing said pin about said bore.

7. A pin according to claim 6 wherein said guide element comprises a tab extending essentially radially inward.

8. A pin according to claim 7 wherein said tab extends slightly oblique to a perpendicular plane to said axis.

9. A pin according to claim 6 wherein said pin has an outer circumferential surface which comprises the inner race of said rolling bearing.

* * * * *